United States Patent
Chang et al.

(10) Patent No.: US 6,377,510 B2
(45) Date of Patent: Apr. 23, 2002

(54) MEMORY CONTROL SYSTEM FOR CONTROLLING WRITE-ENABLE SIGNALS

(75) Inventors: Nai-Shung Chang; Tsai-Sheng Chen; Shu-Hui Chen, all of Taipei Hsien (TW)

(73) Assignee: Via Technologyies, Inc., Taipei Hsien (TW)

( * ) Notice: Subject to any disclaimer, the term of this patent is extended or adjusted under 35 U.S.C. 154(b) by 0 days.

(21) Appl. No.: 09/756,586

(22) Filed: Jan. 9, 2001

Related U.S. Application Data

(60) Provisional application No. 60/177,906, filed on Jan. 25, 2000.

(30) Foreign Application Priority Data

Jul. 5, 2000 (TW) ......................................... 89113311 A

(51) Int. Cl.[7] ................................................. G11C 7/00
(52) U.S. Cl. .............................. 365/230.06; 365/189.02
(58) Field of Search ........................ 365/230.06, 189.02

(56) References Cited

U.S. PATENT DOCUMENTS 6,067,255 A * 5/2000 Jung et al. ............. 365/189.02

* cited by examiner

Primary Examiner—M. Tran
(74) Attorney, Agent, or Firm—J.C. Patents

(57) ABSTRACT

A memory control system for controlling write-enable signals. The memory control system has a first memory slot having a write-enable pin thereon, a second memory slot having a first write-enable pin and a second write-enable pin thereon and a control chipset having a write-enable pin and a dual-purpose write-enable/memory-parity-data pin thereon. The write-enable pin of the control chipset is connected to the write-enable pin of the first memory slot and the first write-enable pin of the second memory slot. The write-enable/memory-parity-data pin of the control chipset is connected to the second write-enable pin of the second memory slot. In this invention, since the design of the write-enable system is more flexible, length of trace line on a computer board can be greatly reduced. In addition, the system permits the incorporation of one cycle (1T) timing into design of memory access commands.

16 Claims, 3 Drawing Sheets

MEMORY CONTROL SYSTEM FOR CONTROLLING WRITE-ENABLE SIGNALS

CROSS-REFERENCE TO RELATED APPLICATION

This application claims the priority benefit of U.S.A. application Ser. No. 60/177,906, filed Jan. 25, 2000 and Taiwan application serial no. 89113311, filed Jul. 5, 2000.

BACKGROUND OF THE INVENTION

1. Field of Invention

The present invention relates to a high-speed memory access control system. More particularly, the present invention relates to the write-enable and data-mask control system of dynamic random access memory (DRAM) on a computer main board.

2. Description of Related Art

Most personal computer systems consist of a main board, interface cards and peripheral devices. The main computer board is the heart of a computer system. Besides having a central processing unit (CPU), a control chipset and a few slots for inserting interface cards, the main computer board also includes a plurality of memory slots. The number of memory modules inserted into the slots depends on the user's need. In general, each memory module consists of a few memory units. Nowadays, most personal computers have total internal memory ranging from a few tens of megabytes to several hundreds of megabytes.

The memory used inside most personal computers, such as synchronous dynamic access memory (SDRAM), transfers data in response to the rising edge of a clock pulse signal. However, there is another type of memory called double-data-rate dynamic random access memory (DDR DRAM). The DDR DRAM has double data transfer rate because the memory transfers data in response to both the rising edge and falling edge of a clock pulse signal.

At present, both SDRAM and DDR DRAM modules are developed in parallel. In general, DDR DRAM modules use memory slots that meet JEDEC standard 184-pin configuration while SDRAM modules use 168-pin memory slots. Due to considerations such as marketing, administration, production cost, compatibility and expandability, a main board that can support both SDRAM and DDR DRAM memory modules is in great demand. However, since 184-pin and 168-pin memory slots have slightly different designs for accommodating the operations of modules, the length of some signal lines on the main board may increase if both types of memory slots coexist.

Rapid development of semiconductor technologies has increased the processing power of CPU. Most personal computers now operate with a clocking frequency up to several hundred MHz. As the clocking rate of CPUs increase, the clocking frequency of memory units must also increase to 100 MHz or above. In high-speed operations, the layout of the control circuit for the memory modules must be designed such that long trace length is avoided. In addition, signal interference between conductive wires as well as timing factors must also be considered. Hence, to design a motherboard having slots capable of accommodating both 184-pin and 168-pin memory modules is a difficult task.

FIG. 1 is a diagram showing a conventional write-enable control system of a computer main board having both 184-pin and 168-pin memory slots thereon. As shown in FIG. 1, a control chipset 10 having just one write-enable pin SWE#, a 184-pin memory slot 12 and a 168-pin memory slot is provided. The 184-pin memory slots 12 has one write-enable pin WE#, but the 168-pin memory slot 14 has two write-enable pins WE1# and WE2#, the $27^{th}$ and $48^{th}$ pin respectively. The overall length L of write-enable line includes the distance L1 from the write-enable pin SWE# of the control chipset 10 to the write-enable pin WE# of the 184-pin memory slot 12, the distance L2 from the write-enable pin WE# of the memory slot 12 to the first write-enable pin WE1# of the 168-pin memory slot 14 and the distance L3 from the write-enable pin WE1# of the 168-pin memory slot 14 to the write-enable pin WE2# of the same memory slot 14.

In a typical example, the overall length L i.e. L1+L2+L3) is about 4877 mils. In general, a shorter trace length can have a larger timing margin. For a trace length of up to 4877, the timing margin is rather small which may pin to system instability. Moreover, the long trace line renders rapid one-cycle (1T) memory access command difficult to implement. However, a memory access command timing of two cycles (2T) can reduce the operating speed of a system considerably. This is extremely important for a computer system having DDR DRAM modules.

SUMMARY OF THE INVENTION

Accordingly, one object of the present invention is to provide a memory control system that enables system designers to design a computer system having slots that can accommodate two different types of memory modules. Moreover, the computer system is able to maintain a high timing margin even when operating at a high operating speed so that system stability is improved. Furthermore, because the system permits the incorporation of one cycle (1T) timing into the design of memory access commands, system performance of the computer system is boosted.

To achieve these and other advantages and in accordance with the purpose of the invention, as embodied and broadly described herein, the invention provides a memory control system for controlling write-enable signals. The memory control system includes a first memory slot, a second memory slot and control chipset. The first memory slot has a write-enable pin thereon, and the slot can accommodate a first type of memory module. The second memory module has a first write-enable pin and a second write-enable pin thereon, and the slot can accommodate a second type of memory module. The control chipset has a write-enable pin and a dual-purpose write-enable/memory-parity-data pin. The chipset controls data transaction with any first type memory module in the first memory slot and any second type memory module in the second memory slot. The write-enable pin of the control chipset is connected to the write-enable pin of the first memory slot and the first write-enable pin of the second memory slot. The write-enable/memory-parity-data pin of the chipset is connected to the second write-enable pin of the second memory slot.

With regard to the memory control system of this invention, an enable signal is sent from the write-enable/memory-parity-data pin when the control chipset writes data into the second memory module. The first memory slot of this invention can include a memory-parity-data pin. The memory-parity-data pin of the first memory slot and the write-enable/memory-parity-data pin of the control chip can be connected together. Whenever the control chipset writes data into the first type memory module with the first type memory module having parity-data memory, the write-enable/memory-parity-data pin will assert a memory-parity-data signal.

According to the memory control system of this invention, the control chipset includes a multiplexer. The multiplexer is controlled by selection signals such that output from the multiplexer is equivalent to the write-enable signal or the memory-parity-data signal. As soon as the computer system of this embodiment is switched on, the computer system will attempt to read the grouping signal of the second type memory module plugged into the second memory slot. Hence, the selection signals of the multiplexer are set and consequently a write-enable signal or a memory-parity-data signal is asserted from the write-enable/memory-parity-data pin. A computer system similar to the type illustrated in this invention can further include a basic input/output system (BIOS). Hence, the user is able to set the group information via the BIOS so that the selection signals of the multiplexer are also set.

This invention also provides a memory control method suitable for controlling memory write-enable signals in a computer system. The computer system includes a first memory slot having a write-enable pin thereon for plugging a first type memory module, a second memory slot having a first write-enable pin and a second write-enable pin thereon for plugging a second type memory module and a control chipset. The method includes the following steps. First, a write-enable pin and a dual-purpose write-enable/memory-parity-data pin are provided on the control chipset. The write-enable pin of the control chipset is connected to the write-enable pin of the first memory slot and the first write-enable pin of the second memory slot. The write-enable/memory-parity-data pin of the control chipset is connected to the second write-enable pin of the second memory slot. When the control chipset writes data to the second memory module, the write-enable/memory-parity-data asserts a write-enable signal.

The first memory slot can further include a memory-parity-data pin. The method of this invention further includes the step of connecting the write-enable/memory-parity-data pin to the memory-parity-data pin of the first memory slot. When the control chipset write data to the first type memory module with the first type memory module having parity-data memory, the write-enable/memory-parity-data pin asserts a memory-parity-data data signal.

Since the control chipset of this invention provides an additional pin for sending out a write-enable signal, computer system design is easier and more flexible. Furthermore, the length of write-enable trace line on the computer main board is considerably reduced and timing margin is increased. Moreover, since one-cycle (1T) timing mode can be used, system performance is improved.

Based on similar considerations, this invention provides an alternative memory control system. The memory control system includes a first memory slot for plugging a first type memory module, a second memory slot for plugging a second type memory module and a control chipset for controlling data access of any first type memory module in the first memory slot or second type memory module in the second memory slot. The first memory slot has a first data-mask pin while the second memory slot has a second data-mask pin. The control chipset has a data mask pin and a dual-purpose data-mask/memory-parity-data pin. The data-mask pin of the control chipset is connected to the first data-mask pin of the first memory slot. The data-mask/memory-parity-data of the control chipset is connected to the second data-mask pin of the second memory slot. When the control chipset of the said control system accesses data in the second type memory module, the data-mask/memory-parity-data pin asserts a data-mask signal.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
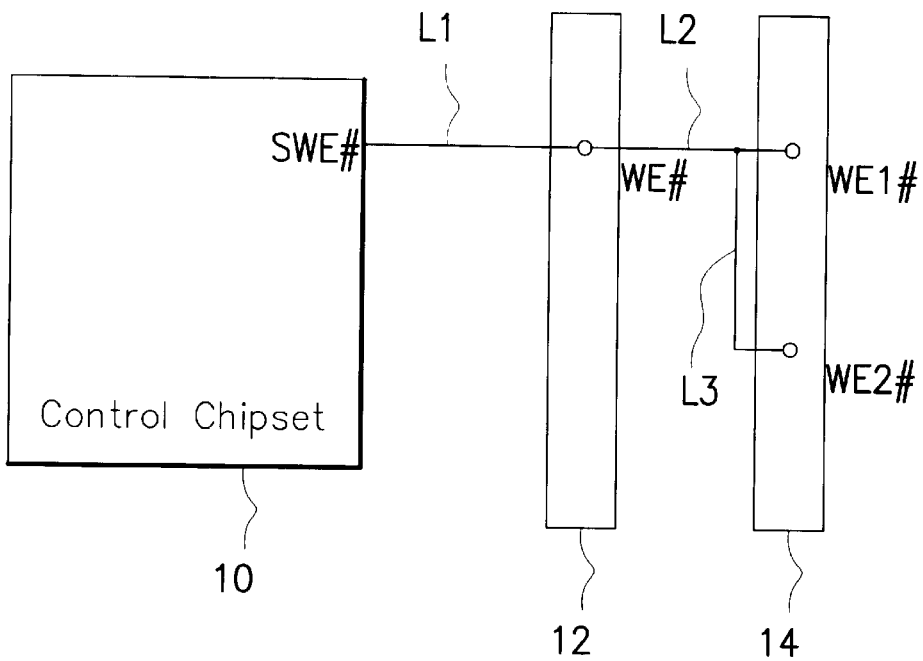
FIG. 1 is a diagram showing a conventional write-enable control system of a computer main board having both 184-pin and 168-pin memory slots thereon.

Reference will now be made in detail to the present preferred embodiments of the invention, examples of which are illustrated in the accompanying drawings. Wherever possible, the same reference numbers are used in the drawings and the description to refer to the same or like parts.

Figure 2:
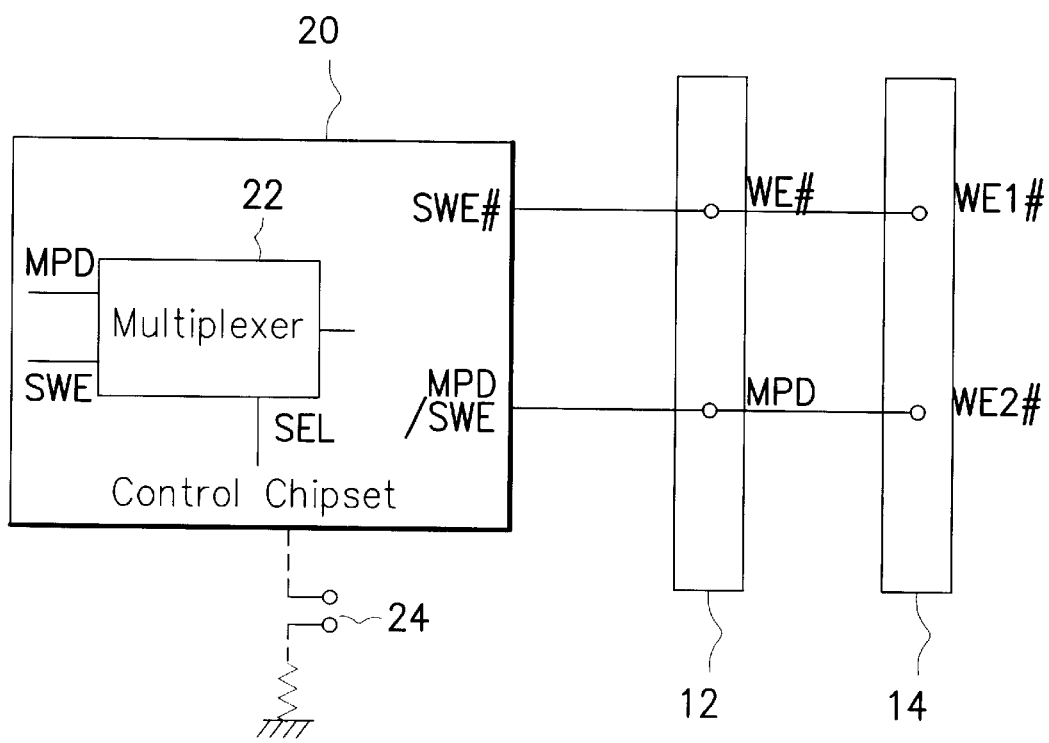
FIG. 2 is a diagram showing a memory write-enable control system of a computer main board having two types of slots for accommodating two types of memory modules according to a first preferred embodiment of this invention.

FIG. 2 is a diagram showing a memory write-enable control system of a computer main board having two types of slots for accommodating two types of memory modules according to a first preferred embodiment of this invention. As shown in FIG. 2, a memory control system for controlling write-enable signal is provided. The memory control system includes a first memory slot 12, a second memory slot 14 and a control chipset 20. The first memory slot 12, for example, can be a 184-pin slot or a 228-pin slot for accommodating a first type memory module such as a 184-pin memory module or a 224-pin memory module. The first memory slot 12 has a write-enable pin WE#. The second memory slot 14, for example, can be a 168-pin slot for accommodating a second type memory module such as a 168-pin memory module. The second memory slot 14 has at least two write-enable pins including a first write-enable pin WE1# and a second write-enable pin WE2#.

The control chipset 20 is used for controlling the access of data of any first type memory module on the memory slot 12 or any second type memory module on the memory slot 14. The control chipset 20 includes a write-enable pin SWE# and a dual-purpose write-enable/memory-parity-data pin MPD/SWE# as shown in FIG. 2. The write-enable pin SWE# is connected to the write-enable pin WE# of the first memory slot 12 and the first write-enable pin WE1# of the second memory slot 14. The write-enable/memory-parity-data pin MPD/SWE# is connected to the second write-enable pin WE2# of the second memory slot 14.

In this embodiment, the dual-purpose write-enable/memory-parity-data pin MPD/SWE# is obtained by redefining the memory-parity-data pin of a conventional control chipset. In general, a conventional control chipset has eight memory-parity-data pins. The dual-purpose pin in this invention is selected from one of the eight memory-parity-data pins. Because most computer systems rarely use memory program data bits for inspection in addition to having several memory-parity-data pins in a control chipset, a memory-parity-data pins having the closest distance to the second write-enable pin WE2# of the second memory slot 14 can be chosen. Hence, utilizing this common phenomenon, length of connecting trace line is considerably reduced without having to provide additional pins on the control chipset 20. Moreover, anybody familiar with the technology may notice that any other signal pins having dual-purpose function can also be used in this invention.

When the control chipset 20 writes data to the second type memory module, the write-enable/memory-parity-data pin MPD/SWE# asserts a write-enable signal. As shown in FIG. 2, the first memory slot of this invention can include a memory-parity-data pin MPD. The memory-parity-data pin MPD is connected to the write-enable/memory-parity-data pin MPD/SWE# of the control chipset 20. In other words, when the control chipset 20 writes data into a first type memory module having parity-data memory, the write-enable/memory-parity-data pin MPD/SWE# will assert a memory-parity-data pin signal.

The memory control system's control chipset 20 further includes a multiplexer 22. The multiplexer 22 is set by a selection signal SEL in such a way that the output of the multiplexer 22 is equivalent to the write-enable signal or the memory-parity-data signal. The selection signal SEL is determined from the grouping status of the system memory modules. In other words, the computer system must contain memory type information that corresponds to the memory type of the memory modules in the slots. With such information, the selection signal SEL can direct the write-enable/memory-parity-data pin MPD/SWE# to output correct signals. Grouping information can be established during computer system start-up. The computer system may attempt to read the serial-presence-detect (SPD) data of memory modules, in particular the SPD grouping information from the second type memory modules, so that the said selection signal is set.

Anyone familiar with the technologies involved may notice that the grouping information may be set via the basic input/output system (BIOS) of a computer system and hence the selection signal is set. In addition, a more direct method includes putting a jumper 24 in the system of this invention that leads to the control chipset 205 so that the said selection signal can be set. Hence, the write-enable/memory-parity-data pin MPD/SWE# can assert a correct write-enable or a memory-parity-data signal.

Figure 3:
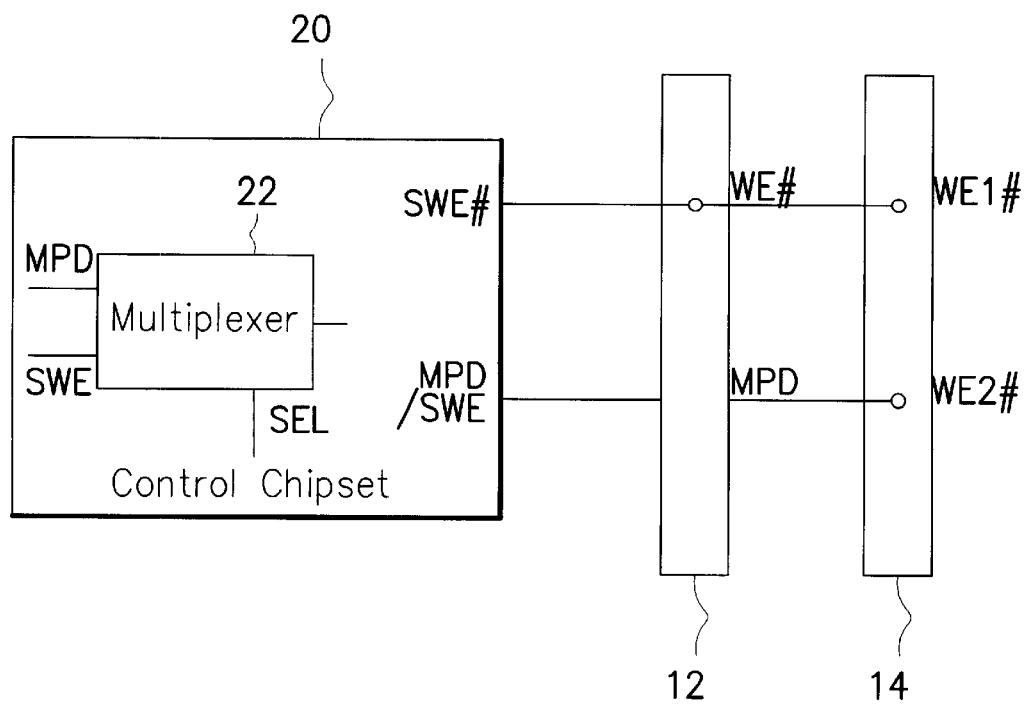
FIG. 3 is a diagram showing a memory write-enable control system of a computer main board having two types of slots for accommodating two types of memory modules according to a second preferred embodiment of this invention.

FIG. 3 is a diagram showing a memory write-enable control system of a computer main board having two types of slots for accommodating two types of memory modules according to a second preferred embodiment of this invention. As shown in FIG. 3, the write-enable/memory-parity-data pin MPD/SWE# is not connected to the memory-parity-data pin MPD. Hence, computer systems that use the second embodiment of this invention do not have memory-parity-data inspection function. However, with this system configuration, the using of memory modules having parity-data memory therein even when both types of memory modules are plugged into the slots can be avoided.

In the second embodiment of this invention, a method of controlling memory suitable for controlling memory write-enable signals in a computer system is provided. The computer system includes a first memory slot having a write-enable pin thereon for plugging a first type memory module, a second memory slot having a first write-enable pin and a second write-enable pin thereon for plugging a second type memory module and a control chipset. The method includes the following steps. First, a write-enable pin and a dual-purpose write-enable/memory-parity-data pin are provided on the control chipset. The write-enable pin of the control chipset is connected to the write-enable pin of the first memory slot and the first write-enable pin of the second memory slot. The write-enable/memory-parity-data pin of the control chipset is connected to the second write-enable pin of the second memory slot. When the control chipset writes data to the second memory module, the write-enable/memory-parity-data asserts a write-enable signal.

The first memory slot can further include a memory-parity-data pin. The method of this invention further includes the step of connecting the write-enable/memory-parity-data pin to the memory-parity-data pin of the first memory slot. When the control chipset writes data to the first type memory module with the first type memory module having parity-data memory, the write-enable/memory-parity-data asserts a memory-parity-data data signal.

Since the control chipset of this invention provides an additional pin for sending out a write-enable signal, computer system design is easier and more flexible. Furthermore, length of write-enable trace line on the computer main board is considerably reduced and timing margin is increased. Moreover, since one-cycle (1T) timing mode can be used, system performance also improves.

Figure 4:
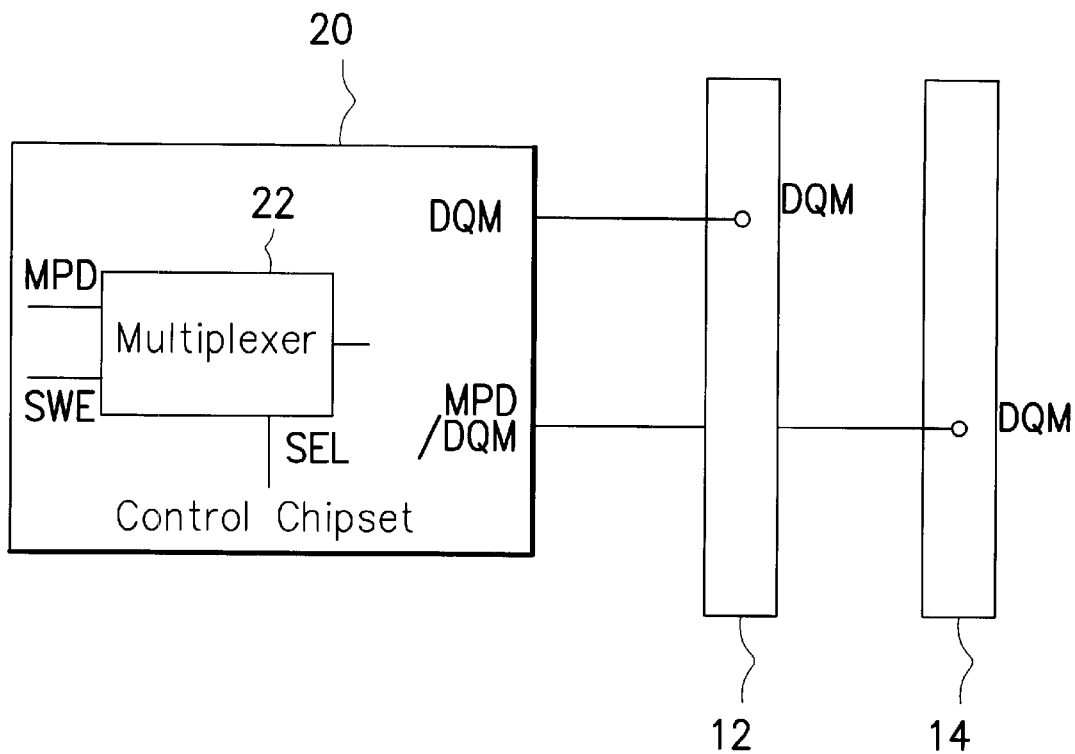
FIG. 4 is a diagram showing a memory write-enable control system of a computer main board having two types of slots for accommodating two types of memory modules according to a third preferred embodiment of this invention.

Based on similar considerations, this invention provides an alternative memory control system. FIG. 4 is a diagram showing a memory write-enable control system of a computer main board having two types of slots for accommodating two types of memory modules according to a third preferred embodiment of this invention. The memory control system includes a first memory slot for inserting a first type memory module, a second memory slot for inserting a second type memory module and a control chipset for controlling data access of any first type memory module in the first memory slot or second type memory module in the second memory slot. The first memory slot has a first data mask pin while the second memory slot has a second data mask pin. The control chipset has a data mask pin and a dual-purpose data-mask/memory-parity-data pin. The data mask pin of the control chipset is connected to the first data mask pin of the first memory slot. The data-mask/memory-parity-data of the control chipset is connected to the second data mask pin of the second memory slot. When the control chipset of the said control system accesses data in the second type memory module, the data-mask/memory-parity-data pin asserts a data mask signal.

In general, the positions of data-mask pin on a 184-pin memory slot and a 168-pin memory slot are very different. In addition, there are eight data-mask pins on each slot. Consequently, the rarely used memory-parity-data pins are selected to serve as dual-purpose data-mask/memory-parity-data pins in this embodiment so as to reduce the degree of difficult in system design and increase flexibility. Another advantage is that the size of a main computer board can be further reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory control system for controlling write-enable signals, comprising:
    a first memory slot having a write-enable pin thereon, wherein the first memory slot can accommodate a first type memory module;
    a second memory slot having a first write-enable pin and a second write-enable pin thereon, wherein the second memory slot can accommodate a second type memory module; and
    a control chipset connected to the first memory slot and the second memory slot for controlling the access of data to and from any first type memory module in the first memory slot or any second type memory module in the second memory slot, wherein the control chipset has a write-enable pin and a dual-definition write-enable/memory-parity-data pin;
    wherein the write-enable pin of the control chipset is connected to the write-enable pin of the first memory slot and the first write-enable pin of the second memory slot, and the write-enable/memory-parity-data pin of the control chipset is connected to the second write-enable pin of the second memory slot.

2. The system of claim 1, wherein the write-enable/memory-parity-data pin asserts a write-enable signal when the control chipset write data into the second type memory module.

3. The system of claim 1, wherein the first memory slot further includes a memory-parity-data pin, the memory-parity-data pin of the first memory slot is connected to the write-enable/memory-parity-data pin of the control chipset.

4. The system of claim 3, wherein the write-enable/memory-parity-data pin asserts a memory-parity-data signal when the control chipset writes data into a first type memory module having parity-data memory.

5. The system of claim 1, wherein the control system further includes a multiplexer controlled by a select signal such that output of the multiplexer can be a write-enable signal or a memory-parity-data signal.

6. The system of claim 5, wherein the assertion of the write-enable signal or the memory-parity-data signal from the write-enable/memory-parity-data pin is depended on the select signal, and the select signal is set by a computer system after reading information in a SPD data of the second type memory module in the second memory slot during system boot up.

7. The system of claim 5, wherein the assertion of the write-enable signal or the memory-parity-data signal from the write-enable/memory-parity-data pin is depended on the select signal, and the select signal is set by a user by programming a basic input/output system (BIOS) during system boot up.

8. The system of claim 5, wherein the memory control system further includes a switch coupled to the control chipset for setting the select signal so that the write-enable/memory-parity-data pin asserts the write-enable signal or the memory-parity-data signal.

9. A memory control system for controlling write-enable signals, comprising:
    a first memory slot having a write-enable pin thereon, wherein the first memory slot can accommodate a first type memory module;
    a second memory slot having a first write-enable pin and a second write-enable pin thereon, wherein the second memory slot can accommodate a second type memory module; and
    a control chipset connected to the first memory slot and the second memory slot for controlling data access to and from any first type memory module in the first memory slot or any second type memory module in the second memory slot, wherein the control chipset has a write-enable pin and a dual-purpose write-enable/other-signal pin;
    wherein the write-enable pin of the control chipset is connected to the write-enable pin of the first memory slot and the first write-enable pin of the second memory slot, and the write-enable/other-signal pin of the control chipset is connected to the second write-enable pin of the second memory slot, and a write-enable signal is asserted from the write-enable/other-signal pin when control chipset write data into the second type memory module.

10. A method of controlling memory for controlling memory write-enable signals in a computer system, the computer system includes a first memory slot having a write-enable pin thereon for plugging a first type memory module, a second memory slot having a first write-enable pin and a second write-enable pin thereon for plugging a second type memory module, and a control chipset, comprising the steps of:
    providing a write-enable pin and a dual-purpose write-enable/memory-parity-data pin on the control chipset;
    connecting the write-enable pin of the control chipset to the write-enable pin of the first memory slot and the first write-enable pin of the second memory slot;
    connecting the write-enable/memory-parity-data pin of the control chipset to the second write-enable pin of the second memory slot; and
    asserting a write-enable signal from the write-enable/memory-parity-data pin when the control chipset writes data to the second memory module.

11. The method of claim 10, wherein the first memory slot includes a memory-parity-data pin, and further includes the steps of:
    connecting the write-enable/memory-parity-data pin to the memory-parity-data pin of the first memory slot; and
    asserting a memory-parity-data signal from the write-enable/memory-parity-data pin when the control chipset write data to the first type memory module with the first type memory module having parity-data memory.

12. The method of claim 11, wherein the control system further includes a multiplexer controlled by a select signal such that output from the multiplexer can be the write-enable signal or the memory-parity-data signal.

13. The method of claim 12, further includes reading information in a SPD data of the second type memory module in the second memory slot during system boot up so that the select signal is set.

14. The method of claim 12, wherein the computer system further includes a basic input/output system (BIOS), and the select signal is set by a user by programming the basic input/output system (BIOS) during system boot up.

15. A memory control system, comprising:
    a first memory slot having a first data-mask pin thereon, wherein the first memory slot can accommodate a first type memory module;
    a second memory slot having a second data-mask pin thereon, wherein the second memory slot can accommodate a second type memory module;
    a control chipset connected to the first memory slot and the second memory slot for controlling data access of any first type memory module in the first memory slot or any second type memory module in the second memory slot, wherein the control chipset has a data-mask pin and a dual-definition data-mask/memory-parity-data pin;

wherein the data mask pin of the control chipset is connected to a first data mask pin of the first memory slot and the data-mask/memory-parity-data of the control chipset is connected to a second data mask pin of the second memory slot.

16. The system of claim 15, wherein the data-mask/memory-parity-data pin asserts a data-mask signal when the control chipset accesses data in the second type memory module.

* * * * *